United States Patent
Johansson (10) Patent No.: US 6,739,822 B2
(45) Date of Patent: May 25, 2004

(54) TRACTION VEHICLE FOR AIRCRAFT AND ENGAGEMENT AND HOISTING DEVICE THEREFOR

(75) Inventor: Magnus Johansson, Ljungbyholm (SE)

(73) Assignee: Kalmar Motor AB, Kalmar (SE)

( * ) Notice: Subject to any disclaimer, the term of this patent is extended or adjusted under 35 U.S.C. 154(b) by 0 days.

(21) Appl. No.: 10/312,393

(22) PCT Filed: Jun. 21, 2001

(86) PCT No.: PCT/SE01/01429
§ 371 (c)(1),
(2), (4) Date: Dec. 26, 2002

(87) PCT Pub. No.: WO02/00501
PCT Pub. Date: Jan. 3, 2002

(65) Prior Publication Data
US 2003/0165375 A1 Sep. 4, 2003

(51) Int. Cl.[7] .............................................. B60B 29/00
(52) U.S. Cl. ........................ 414/427; 414/429; 180/904; 244/50
(58) Field of Search ................................ 414/426, 427, 414/429; 180/904; 244/50

(56) References Cited

U.S. PATENT DOCUMENTS

| | | | |
|---|---|---|---|
| 2,732,088 A | * 1/1956 | Arnot ........................ 414/428 |
| 2,877,913 A | * 3/1959 | Arnot et al. ................. 414/428 |
| 3,825,869 A | * 7/1974 | Loomis ....................... 414/427 |
| 4,375,244 A | * 3/1983 | Morin ........................ 180/14.7 |
| 4,576,245 A | 3/1986 | Oldani |
| 4,632,625 A | * 12/1986 | Schuller et al. ............. 414/429 |
| 4,836,734 A | * 6/1989 | Pollner et al. .............. 414/430 |
| 5,051,052 A | * 9/1991 | Franken et al. ............. 414/428 |
| 5,302,074 A | 4/1994 | Elfstrom |
| 5,860,785 A | * 1/1999 | Eberspacher ................ 414/428 |

FOREIGN PATENT DOCUMENTS

| | | |
|---|---|---|
| SE | 591788 | 5/1995 |
| WO | 98/25822 | 6/1998 |

* cited by examiner

Primary Examiner—Khoi H Tran
(74) Attorney, Agent, or Firm—Nixon & Vanderhye P.C.

(57) ABSTRACT

A traction vehicle for moving a nose wheel of an aircraft comprises a wheel-mounted chassis including an engagement and hoisting device that can be raised and lowered. The engagement and hoisting device has a nose-wheel holder and a U-shaped stand having an opening facing the aircraft. The nose-wheel holder and the stand are shaped as two separate units and have co-operating journaling members arranged in a circular arc to provide rotational movement between the holder and the stand.

20 Claims, 8 Drawing Sheets

Fig-2

TRACTION VEHICLE FOR AIRCRAFT AND ENGAGEMENT AND HOISTING DEVICE THEREFOR

BACKGROUND OF THE INVENTION

The present invention relates to a traction vehicle for ground movement of an aircraft, having at least one nose wheel, which traction vehicle comprises a wheel-mounted chassis and an engagement and hoisting device that can be raised and lowered relative to the chassis and is of a type that is brought into freely carrying engagement with the nose wheel and which comprises a stand, being substantially U-shaped with its opening turned towards the aircraft, journalling members, flexibly connecting the stand to the chassis, actuators, arranged between the stand and the chassis to raise and lower the engagement and hoisting device relative to the chassis, and a nose-wheel holder, having an inner space that can be opened in the direction of the nose wheel for receiving the same, carrying members for carrying the nose wheel in said space, and forward and rear wheel supports for holding the nose wheel in the longitudinal direction of the traction vehicle.

The invention also relates to such an engagement and hoisting device.

Once the maximum steering angle of an aircraft has been attained, whilst moving the aircraft on the ground with the aid of a traction vehicle coupled to the nose wheel of the aircraft, when the direction of travel of the traction vehicle is changed, torque is transferred to the nose-wheel stand via the nose wheels and its upwardly-directed steering or rotary axle. This torque must not exceed prescribed values laid down by the various aircraft manufacturers in question. In the following, this maximum permitted torque is referred to as the maximum torque or maximum value.

A traction vehicle in accordance with the preamble to claim 1 is known through SE-500 744. The engagement and hoisting device supported by the chassis of the traction vehicle is arranged to be brought into a starting position close to, but not touching, the nose wheels of the aircraft, both in front of and behind the contact point between the nose wheels and the ground, when the traction vehicle is moved relative to the nose wheels, and to be raised from said starting position in order, when in free surface contact with the nose-wheel tread on both sides of said contact point with the ground, to be brought into releasable engagement with the nose wheels so that the same are lifted from the ground when the engagement and hoisting device is raised. The engagement and hoisting device forms a rigid connection between the nose wheels and the chassis. Thus, to enable a change of angle between the traction vehicle and the aircraft, the steering hydraulics of the aircraft must be disconnected and the rotary movement of the nose wheels limited by mechanical terminal stops on the aircraft. At these terminal stops, the aircraft has attained its maximum steering angle and torque will be transmitted to the nose-wheel unit, via the rotary axle of the nose wheels, wherein, as mentioned above, the torque value must not exceed a maximum value determined by the manufacturers of the aircraft. Exceeding the maximum torque without forewarning presents a very great risk of the nose-wheel unit being damaged. SE-501 788 describes a device for measuring and indicating the steering angle of the aircraft relative to the traction vehicle in order, thereby, to prevent the nose-wheel stand being subjected to the harmful maximum torque. However, such a device has the disadvantage that, for instance, a sensor wire must be connected to the aircraft. As designs differ from one aircraft to another, it can be difficult to provide equipment to suit all the types of aircraft a traction vehicle must be able to handle.

In another type of traction vehicle, the same is connected to the aircraft with the aid of a traction rod, where torque is limited with the aid of a breakpin in the traction rod or in the fastening of the traction beam to the nose-wheel stand. A disadvantage with this system is that no forewarning is provided before the pre-set torque is exceeded so that the traction vehicle must be substituted or the traction rod replaced. In addition, there is a risk of the nose-wheel stand being damaged because the traction rod is released from the aircraft in some cases.

U.S. Pat. No. 4,576,245 describes a tractor for towing a helicopter or medium-sized aircraft. The tractor has an engagement and hoisting device that can be raised and lowered and consists of a wheel-borne chassis, formed by two beams and a platform mounted thereon, and also a support plate, pivotably journalled on the platform by means of a thrust bearing and intended to support the nose wheel. The support plate has an upright with a hydraulic cylinder, the piston rod of which is provided with a yoke with screws for securing the piston rod to the nose wheel. The helicopter is drawn towards the tractor with the aid of the hydraulic cylinder so that the nose wheel rolls onto the lowered platform to be received on the support plate and retained thereon with the aid of the hydraulic cylinder. Thereafter, the chassis is raised to its towing position. WO 98/25822 describes a tractor for towing an aircraft. The tractor has a platform for carrying the nose wheel. The aircraft is moved forwards towards the platform, whereupon the nose wheel is moved onto the platform with the aid of a ramp. The platform can be provided with a rotary plate on which the nose wheel rests. However, the WO specification does not show any device for retaining the nose wheel on the rotary plate and platform. The platform is arranged such that it can perform a swinging or pendulum movement relative to the chassis in the longitudinal direction of the tractor from a resting position. When the aircraft is moved on the ground, the deviation of the swinging or pendulum movement from the resting position is a measure of the load on the nose wheel in the horizontal and vertical direction. By measuring the swinging or pendulum movement with a linear-movement or angle transducer, the load can be kept within prescribed values by limiting the acceleration or retardation of the tractor when too great a deviation from the resting position is measured. The known traction vehicles in accordance with U.S. Pat. No. 4,576,245 and the WO specification 98/25822 are of a type completely different from the one to which the invention refers. Unlike the traction vehicle in accordance with the invention, they cannot be used for aircraft of varying sizes and they are not intended to be docked to the aircraft. They lack, and cannot be provided with, an engagement and hoisting device that can be raised and lowered relative to a chassis and has a U-shaped stand to enable said docking to a stationary aircraft and provide freely supporting engagement with the nose wheel with the aid of a special nose-wheel holder, the engagement and hoisting device being raised to lift the nose wheel from the ground.

SUMMARY OF THE INVENTION

The object of the present invention is to provide a traction vehicle with an improved engagement and hoisting device that enables security demands from aviation authorities or operative or functional demands from users to be met so that an improved control of and security during the ground movement of the aircraft is obtained, as compared with known traction vehicles.

The traction vehicle, as well as the engagement and hoisting device, is characterised in that the nose-wheel holder and the stand are shaped as two separate units and comprise co-operating journalling members, arranged in a circular arc and defining a vertical axis of rotation for said units and that the nose-wheel holder is substantially U-shaped with its opening turned towards the aircraft as viewed in a starting position, when the nose-wheel holder is situated to be moved into a position to receive the nose wheel.

BRIEF DESCRIPTION OF THE DRAWINGS

The invention will be further described in the following with reference to the drawings.

DETAILED DESCRIPTION OF THE INVENTION

Figure 1:
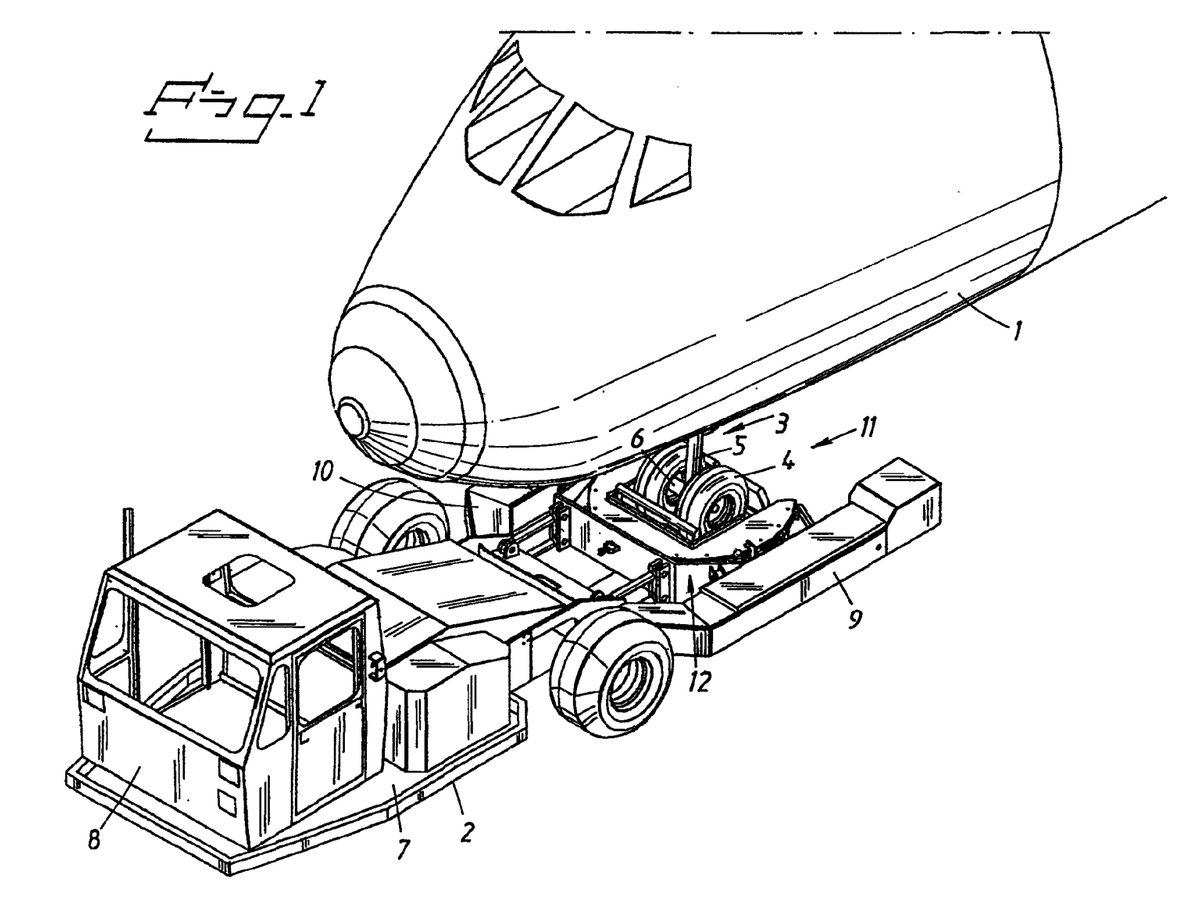
FIG. 1 shows a traction vehicle with an engagement and hoisting device in accordance with the invention carrying an aircraft by its nose wheel.

FIG. 1 shows an aircraft 1 and a traction vehicle 2, provided with wheels, for moving the aircraft 1 relatively short distances on the ground. The aircraft 1 has a nose-wheel unit 3, comprising two nose wheels 4 and an upwardly-directed steering or rotary axle 5 that carries the nose wheels 4 and is rotatably journalled to the nose-wheel unit 3 and lockable in the same with a hydraulic locking mechanism (not shown) to lock the single wheel axle 6 of the nose wheels 4 in a position at right angles to the longitudinal direction of the aircraft 1. The traction vehicle 2 comprises a chassis 7, carrying, at one of its end portions, a driver's cabin 8 and including two longitudinal, horizontal beams 9, 10, spaced a pre-determined distance from each other to define between them a space 11, which is open at the end that faces away from the driver's cabin 8 to be positioned in accordance with the aircraft 1, when the aircraft 1 is to be moved on the ground. At their free end portions, which are turned towards the aircraft 1, the two beams 9, 10 each have a wheel or pair of wheels (not visible in FIG. 1).

The traction vehicle 2 comprises an engagement and hoisting device 12 that can be raised and lowered to be brought into freely supporting engagement with the nose wheels 4, this being the only engagement location, which thus means that the remainder of the traction vehicle 2 is completely free from contact or engagement with the nose-wheel stand 3, and to lift the nose wheels 4 from the ground sufficiently to enable, the aircraft 1 to be moved with the aid of the traction vehicle 2. The engagement and hoisting device 12 is located in said space 11 between the beams 9, 10 and carried by the same via actuators 13 in the shape of power cylinders, by means of which the engagement and hoisting device 12 can be lowered to a lower position at ground level and raised to a towing position, in which the engagement and hoisting device 12 is clear of the ground, as are the nose wheels 4. Further, the engagement and hoisting device 12 is flexibly connected to the chassis 7 via journalling member 15 with suitable elements at its ends to allow the engagement and hoisting device 12 to change positions as desired. In the embodiment shown, the journalling member 15 is formed by four link arms arranged in pairs. Alternatively, it can consist of a single link arm.

Figure 2:
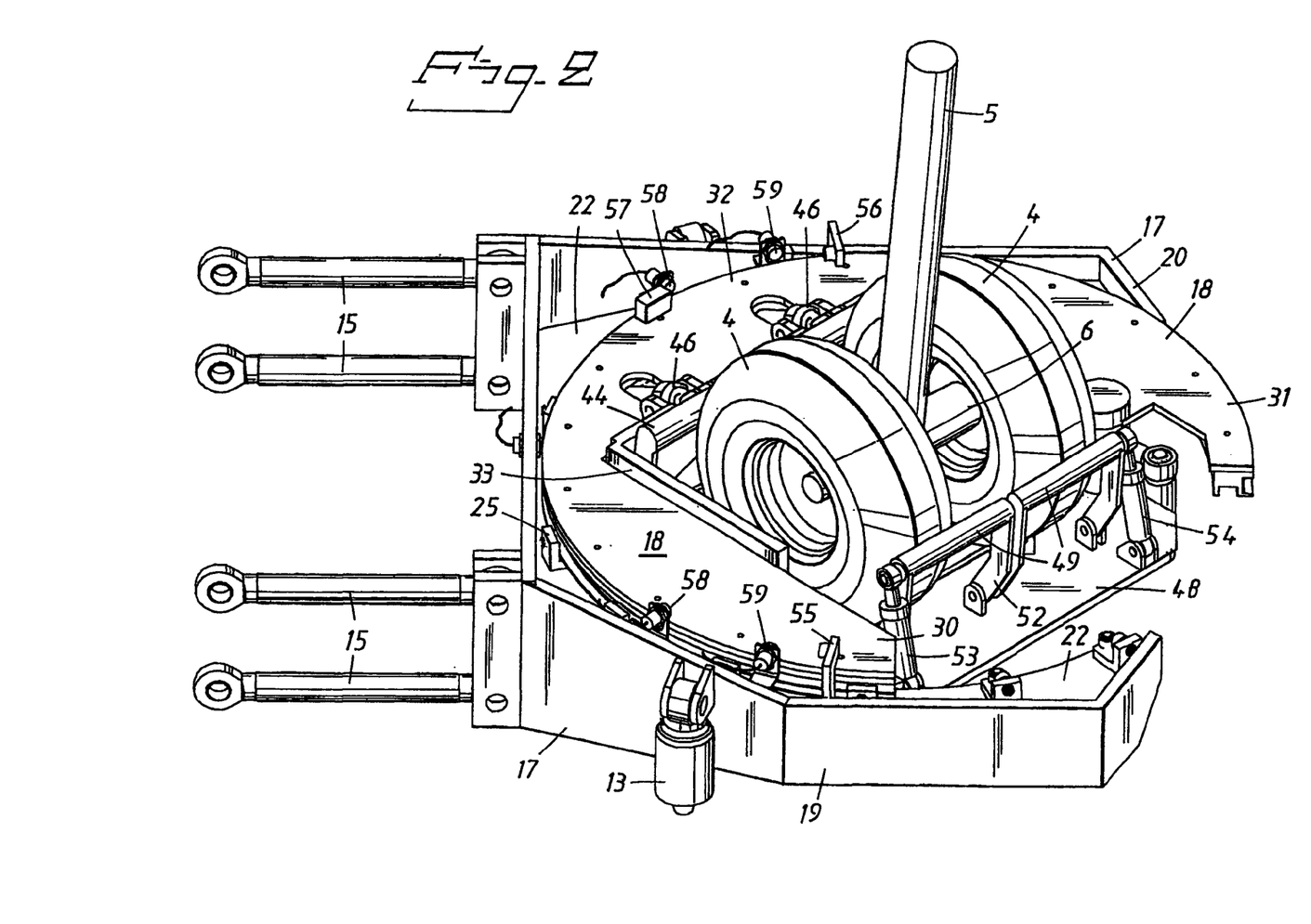
FIG. 2 shows the engagement and hoisting device in accordance with FIG. 1 with its nose-wheel holder rotated in one direction relative to its stand.

As further illustrated in FIG. 2, for instance, the engagement and hoisting device 12 comprises a stand 17 and a nose-wheel holder 18, designed as two separate units and rotatably journalled relative to each other. The stand 17 and the nose-wheel holder 18 are both substantially U-shaped.

The U-shaped stand 17 is arranged horizontally and comprises two rearwardly-turned legs 19, 20 and a transverse connection piece 21, which rigidly connects the legs 19, 20 to each other and extends at right angles to the longitudinal direction of the traction vehicle 2 and on which said link arms 15 are journalled on its outside. The legs 19, 20 and connection piece 21 comprise internal, horizontal bottom plates 22, seamlessly merging into each other and having arc-shaped inner edge portions 23 so that the stand 17 obtains a vertical inside 24 with a pre-determined radius.

The U-shaped nose-wheel holder 18 is horizontally arranged within the U-shaped stand 17, in the same plane, and comprises two legs 30, 31 and a connection piece 32, rigidly connecting the legs 30, 31 to each other and facing the inner parts of the stand 17 (including the connection piece 21 of the stand 17). Each leg 30, 31 has a vertical wall 33, 34 on its inside, the two walls 33, 34 being parallel with each other and defining between them an inner nose-wheel space 35, adapted to the width of the nose wheels 4 so that the same can be received therein with sufficient play against the legs 33, 34, the width of the space 35 being sufficiently large so that even the nose wheels of large aircraft can be received therein, i.e. a single traction vehicle can in principle be used for aircraft of all sizes.

The nose-wheel holder 18 has outer edge portions 36 that are arc-shaped so that it obtains a vertical outside 37 with a pre-determined radius somewhat greater than said radius of the inside 24 of the stand 17.

Figure 4:
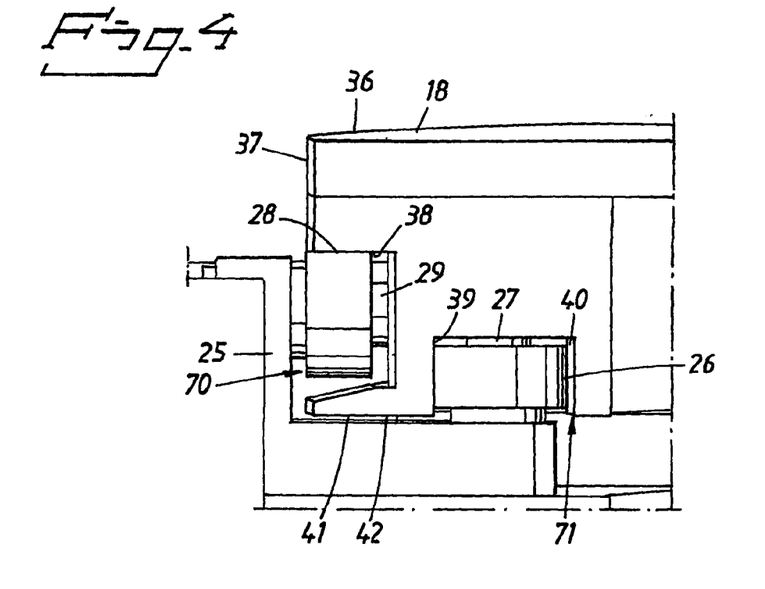
FIG. 4 shows the journalling of the nose-wheel holder to the stand.

The stand 17 and the nose-wheel holder 18 are designed as two separate units, as mentioned above, and comprise co-operating journalling members 70, 71, arranged in a circular arc corresponding to the length of the curved insides 24 and outsides 37 to create a rotation girdle. These outer journalling members 70, 71 define a vertical axis of rotation for said units 17, 18. The journalling member 70 of the stand 17 comprises a plurality of rolling elements, equidistantly mounted on the topside of said bottom plates 22 with the aid of angle profiles 25 along a circular arc of a pre-determined radius. As further illustrated in FIG. 4, each angle profile 25 carries a first roller 26, journalled on a vertical shaft journal 27 on the horizontal part of the angle profile 25, and a second roller 28, journalled on a horizontal shaft 29 on the vertical part of the angle profile 25. Adjacent to the outside 37 of the nose-wheel holder 18, that is radially inside the same, the outer edge portion 36 of the nose-wheel holder 18 is provided with a horizontal carrying and rolling surface 38 for co-operation with the second rollers 28 of the rolling elements and with two vertical, inner and outer, concentric, supporting and rolling surfaces 39, 40 for co-operating with the first rollers 26 of the rolling elements. Thus, said carrying and rolling surface 38 and supporting and rolling surfaces 39, 40 together form the journalling members 71 of the nose-wheel holder 18. The nose-wheel holder 18 is thus carried by said second rollers 28 via its horizontal carrying and rolling surface 38, which extends in a continuous circular arc along the entire outside 37, the carrying and rolling surface 38 being located such, relative to the horizontal underside 41 of the nose-wheel holder 18, that a small clearance gap 42 is created between said underside 41 and the horizontal parts of the angle profiles 25, thereby preventing friction between them. The two concentric supporting and rolling surfaces 39, 40 and the second rollers 28 are arranged at a radial distance from each other that is equal to or only somewhat greater than the diameter of the second rollers 28. The two supporting and rolling surfaces 39, 40 and the second rollers 28 co-operate with each other so that the nose-wheel holder 18 is fixed in the radial direction irrespective of its rotational position. Consequently, the two supporting and rolling surfaces 39, 40 define the vertical axis of rotation.

Figure 5:
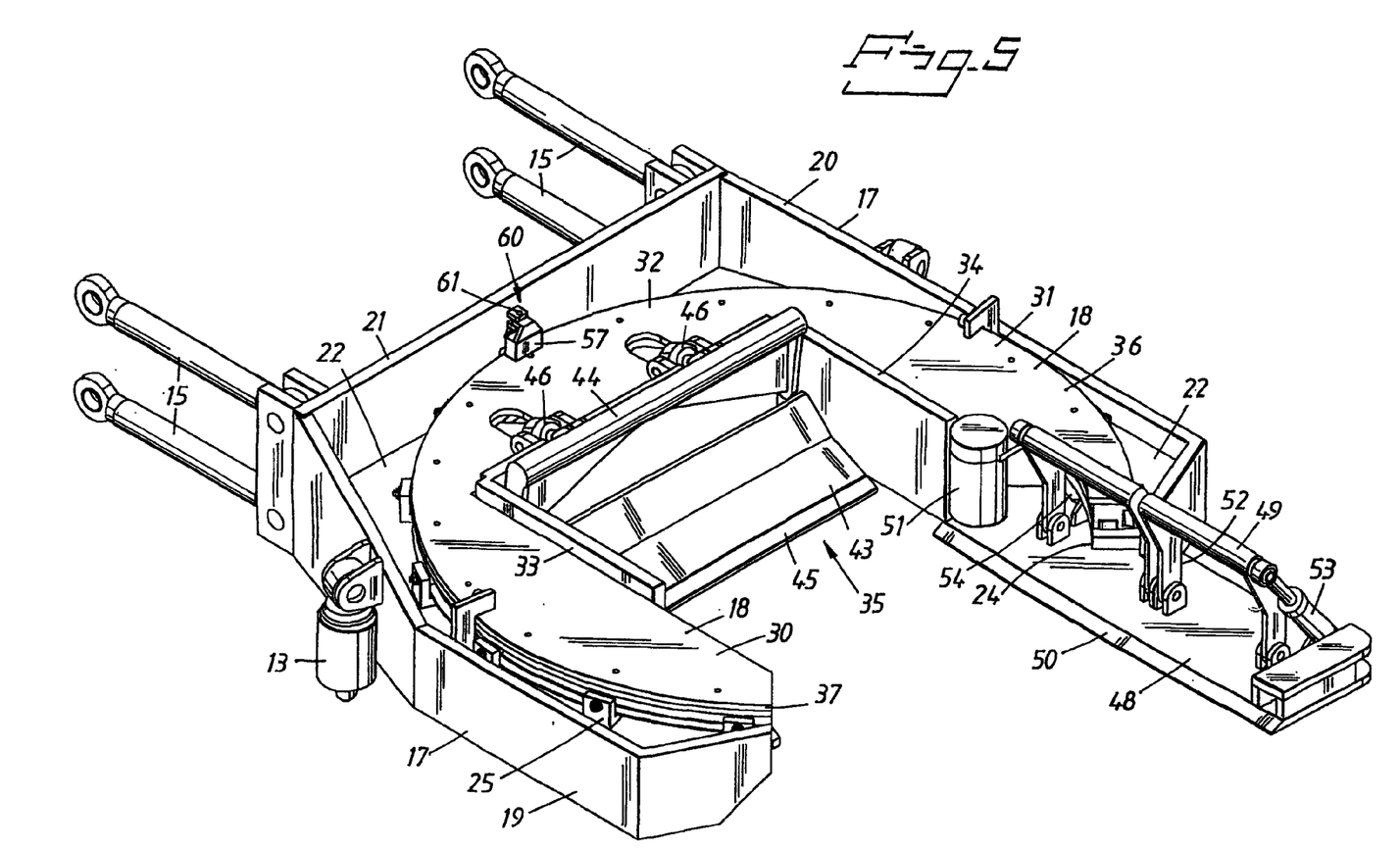
FIG. 5 shows an engagement and hoisting device similar to the one in FIG. 2, but additionally provided with a break-device between the nose-wheel holder and the stand, the engagement and hoisting device being open and ready to receive the nose wheels.

Further, the nose-wheel holder 18 comprises an inner carrying plate 43, see FIG. 5, and an inner, horizontal wheel support 44, located a pre-determined distance above the carrying plate 43. The carrying plate 43 extends between the vertical leg walls 33, 34 and are movably mounted thereon to be displaced relative to the connection piece 21, with the aid of power cylinders (not shown), so that its position can be adjusted and adapted to the dimension of the nose wheel. Thereby, the nose-wheel holder 18 can, with best fit, secure nose wheels of the various dimensions presented by different types of aircraft. The carrying plate 43 has a concave topside that is crudely adapted to the radii of different nose wheels 4 and can be made in sections, as shown in the drawings, or uniformly curved. The carrying plate has a lower, horizontal edge portion 45, which has a downwardly sloping surface and is located in level with or slightly below the underside of the stand. The wheel support 44 is pivotably mounted on the nose-wheel holder 18, two power cylinders 46 being flexibly connected, via their piston rods, to the ends of the wheel support 44 to bring the wheel support 44 to bear against the nose wheels 4.

Moreover, the nose-wheel holder 18 comprises an outer carrying plate 48, and an outer horizontal wheel support 49, located a pre-determined distance above the carrying plate 48 and preferably level with the inner wheel support 44. The carrying plate 48 has a horizontal edge portion 50, which has a downwardly sloping surface and is located in level with the edge portion 45 of the inner carrying plate 43. The outer carrying plate 48 and the outer wheel support 49 together form a gate that is pivotably journalled by means of a vertical rotary shaft, forming part of an actuator 51, in turn rigidly mounted on one of the legs 31 of the nose-wheel holder 18. The gate can be opened and shut with the aid of the actuator 51. The outer wheel support 49, which consists of two parts, is pivotably mounted on the carrying plate 48 via a plurality of link arms 52. Two power cylinders 53, 54 are flexibly connected, via their piston rods, to the ends of the wheel support 49 to bring the wheel support 49 to press against the nose wheels 4, see FIG. 2, for instance. The two co-operating, opposing wheel supports 44, 49 are suitably located on a level above, for instance immediately above, a horizontal plane intersecting the central axles of the nose wheels 4. The nose wheels 4 are thereby also locked in the vertical direction.

The stand 17 and the nose-wheel holder 18 are provided with co-operating stops 55, 56, 57 that limit the rotation of the nose-wheel holder 18 in both directions. In addition, the stand 17 is provided with two terminal position transducers 58, 59, located in front of the two stops 55, 56 on the stand 17, which terminal position transducers 58, 59 sense the stop 57 of the nose-wheel holder 18 to indicate the rotational angle on the nose-wheel holder 18 relative to the stand 17 and the traction vehicle 2 to be used for various control functions, for instance to control the tractive force of the traction vehicle 2 so that it does not diminish and approach zero unless the direction of the traction vehicle 2 is changed back. In the embodiment in accordance with FIGS. 1–3, the nose-wheel holder is freely rotationally suspended on the stand 17 via the rollers 28 of the rolling element. This means that the angle of the traction vehicle 2 relative to the nose wheels 4 can vary without any significant torque being transferred to the nose wheels 4. In this embodiment, the nose wheels 4 can be locked, but they can also be disengaged. It should thus be understood that, when the nose wheels 4 are disengaged, the turning radius of the traction vehicle 2 relative to the aircraft 1 can be further increased by making use of the full rotation angle of the nose-wheel holder 18 as well as the full rotation angle of the disengaged nose wheels 4.

Although the shown journalling members 70, 71 are currently preferred, they can obviously be designed in many other ways, for instance in the shape of a ball-bearing segment or girdle in one of the units and co-operating rolling surfaces for the balls in the other unit.

Figure 3:
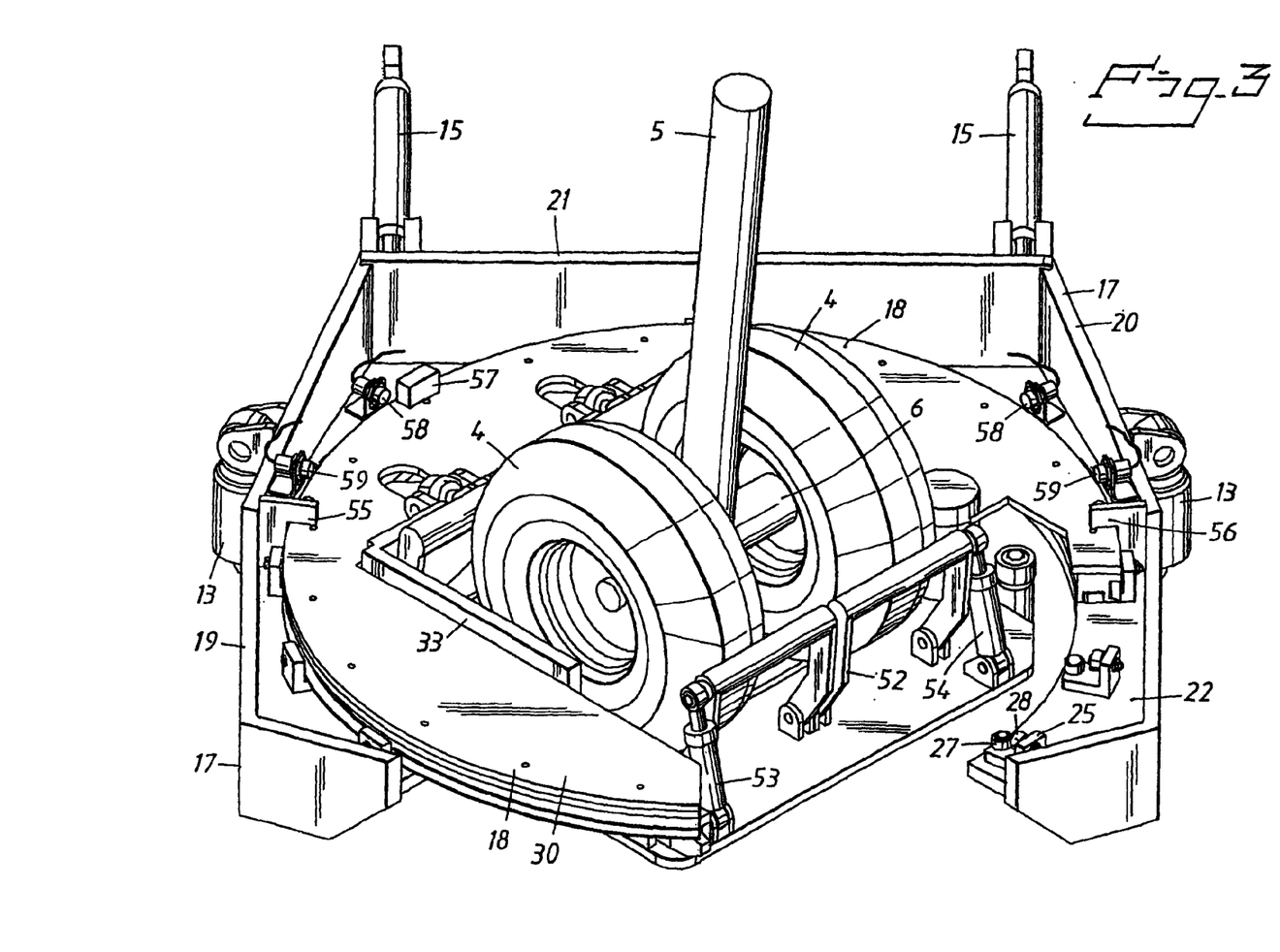
FIG. 3 shows the engagement and hoisting device in accordance with FIG. 2, but with the nose-wheel holder rotated in the other direction relative to its stand.
Figure 6:
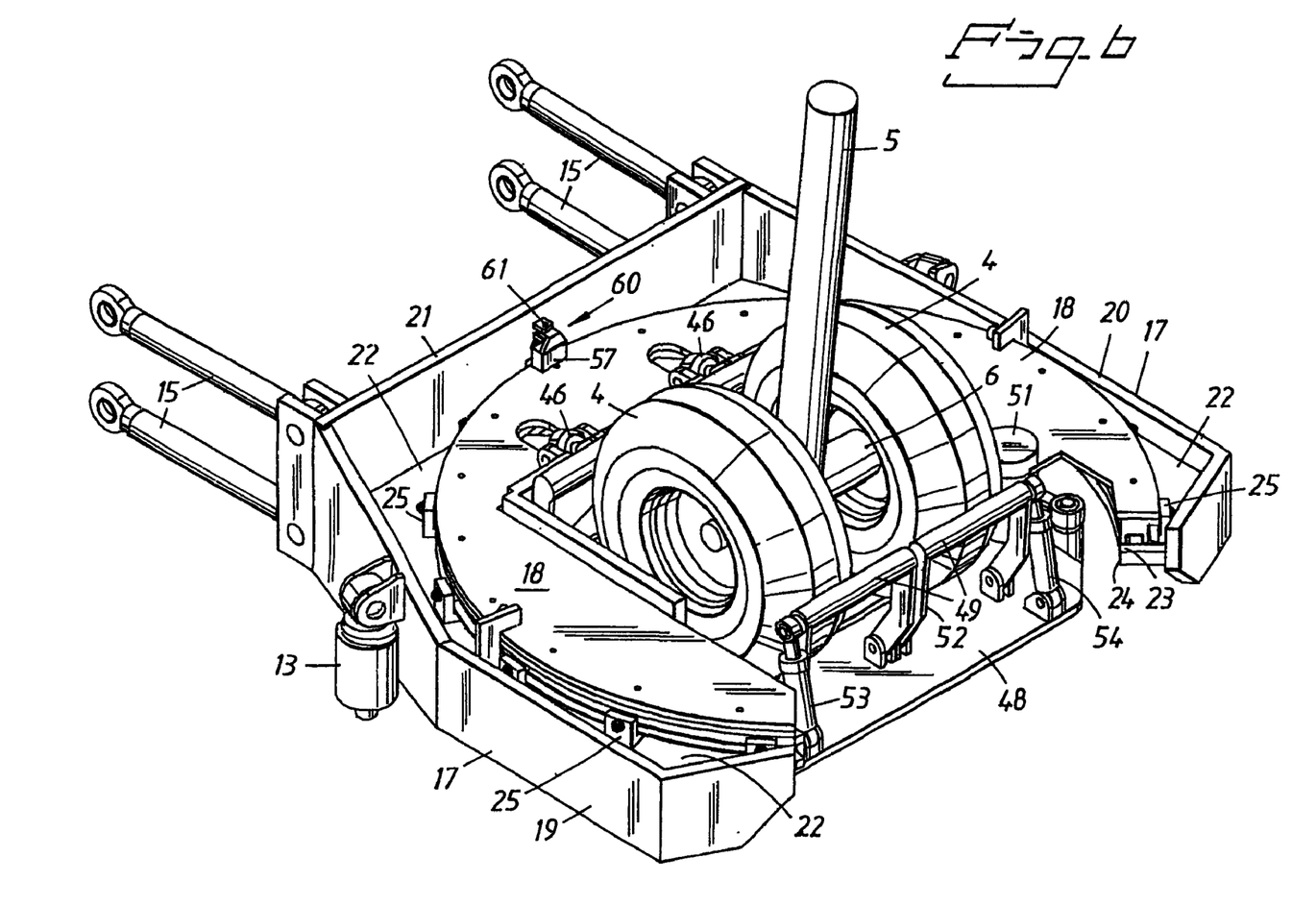
FIG. 6 shows the engagement and hoisting device in accordance with FIG. 5 engaged with the nose wheels.

FIGS. 5 and 6 show an engagement and hoisting device 12, similar to the one in FIGS. 1–3, but additionally provided with a rotation-inhibiting device in the shape of a break-device 60, arranged on the stand 17 and the nose-wheel holder 18 in proximity to its central stop 57, seen in the starting position of the nose-wheel holder 18, when the axle 6 of the nose wheels 4 is at right angles to the longitudinal direction of the traction vehicle 2. The break-device 60 comprises a breakpin 61 that fixes the nose-wheel holder 18 against rotation in said starting position. The breakpin 61 is constructed such that it breaks when the nose-wheel holder 18 is subjected to a certain, permitted torque relative to the stand 17. In this embodiment, the nose wheels 4 of the aircraft 1 are disengaged, whereby the rotary axle 5 of the nose-wheel unit 3 is not permitted to transmit a prescribed, maximum torque to a fixed construction element of the nose-wheel unit. Thus, said permitted torque has a value that is less than the value of said prescribed, maximum torque.

Figure 7:
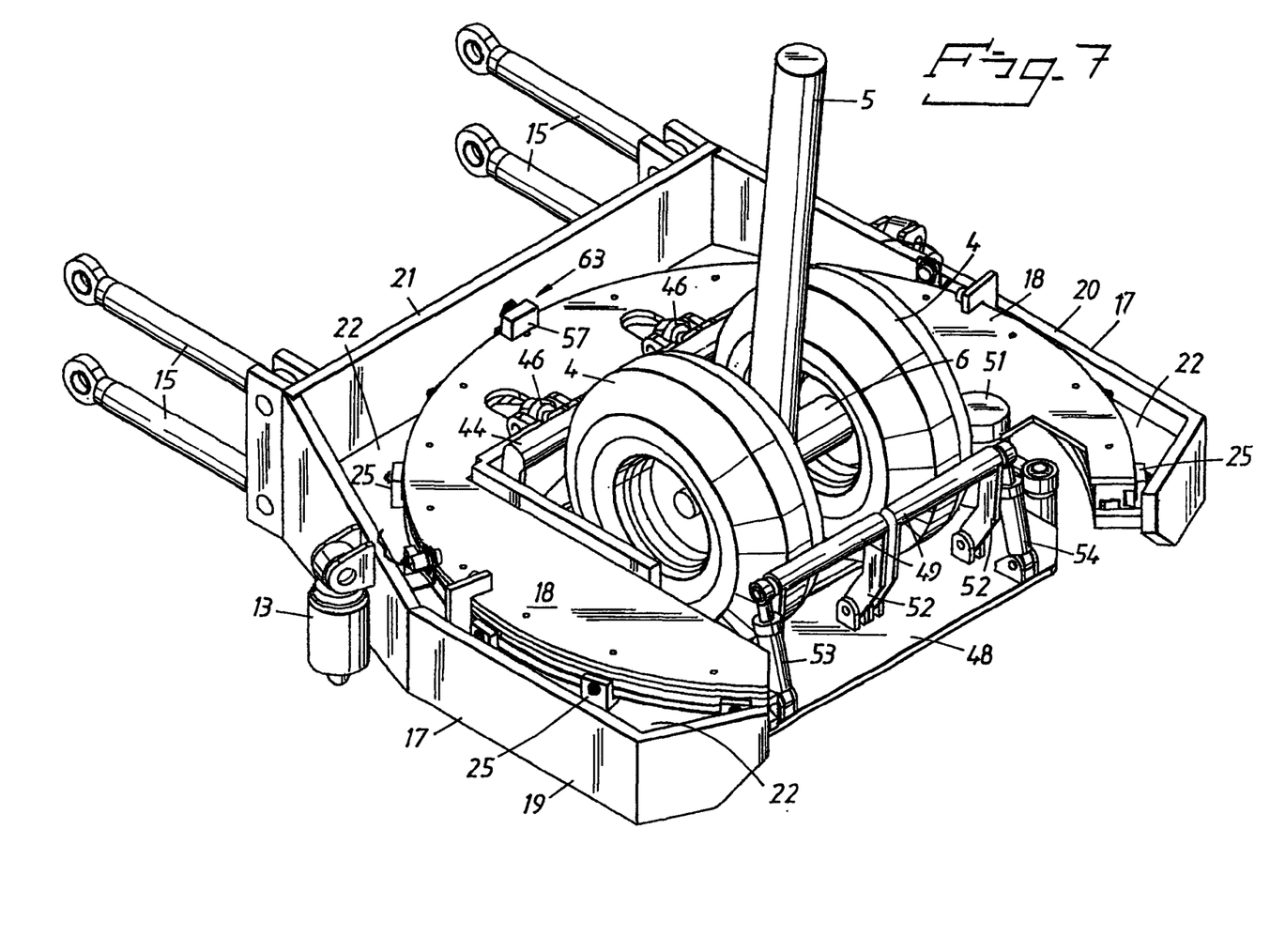
FIG. 7 shows an engagement and hoisting device similar to the one in FIG. 2, but additionally provided with a braking mechanism between the nose-wheel holder and the stand.
Figure 8:
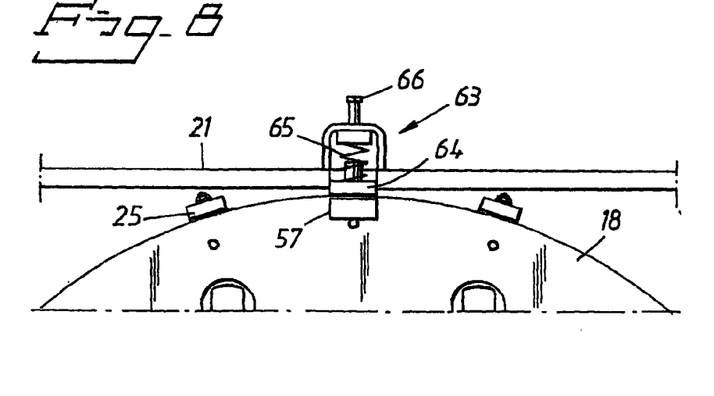
FIG. 8 shows the braking mechanism in FIG. 7.

In the embodiment in accordance with FIG. 7, a braking mechanism 62, the construction of which is further illustrated by FIG. 8, is used instead of a break-device. In this case, the nose-wheel holder 18 is likewise fixed against rotation in its starting position, but also in all other positions between the two terminal stops. The braking mechanism 63 has a braking head 64, bearing against the outside of the nose-wheel holder 18 with the spring force of a spring 65, which spring force is adjustable with a control device 66. The braking mechanism 63 is adapted such that the friction between the braking head 64 and the arc-shaped outside of the nose-wheel holder 18 corresponds to preferably 80 percent or less of said maximum torque. If this pre-set value is exceeded, the nose-wheel holder 18 will rotate.

Figure 9:
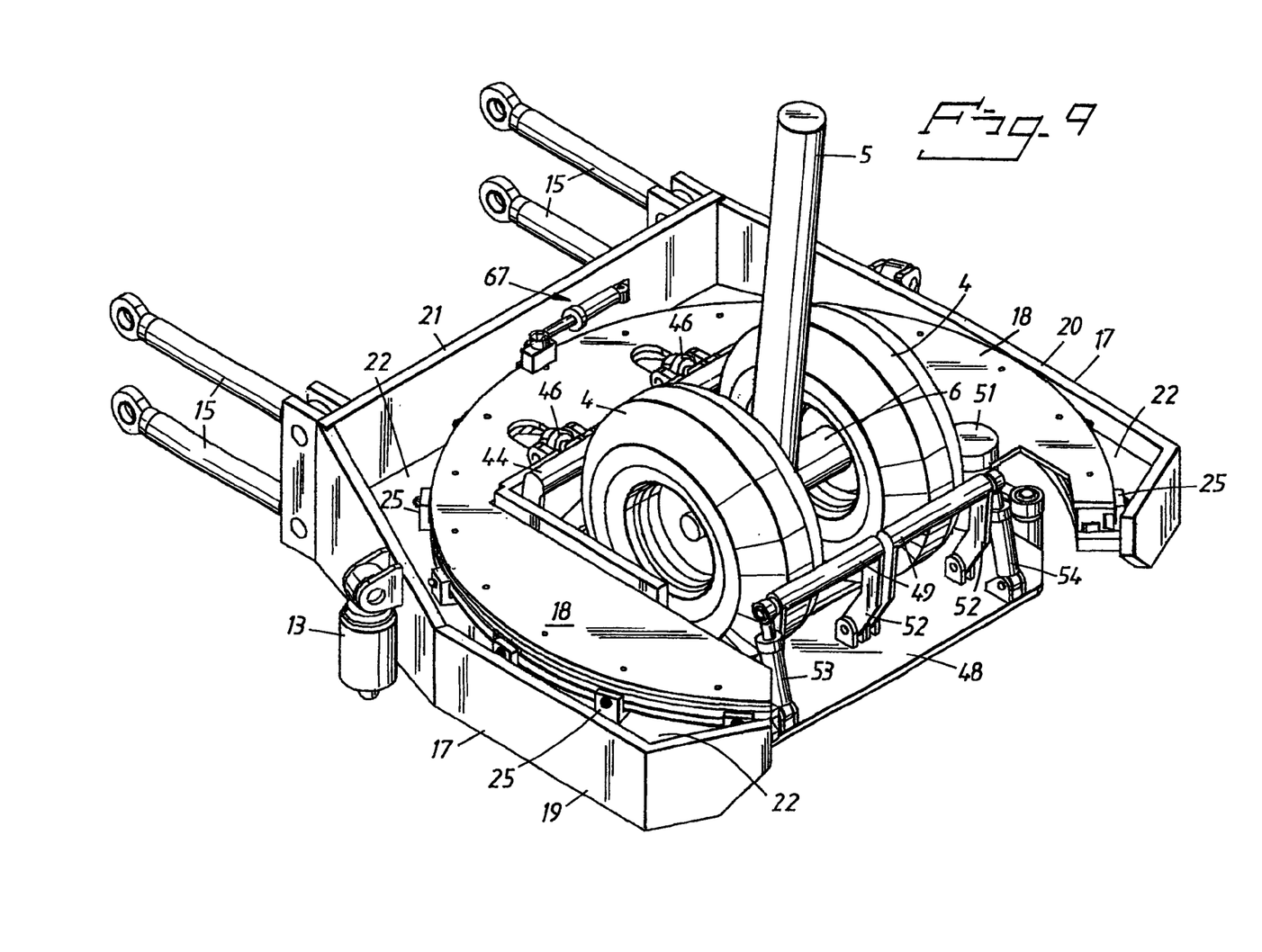
FIG. 9 shows an engagement and hoisting device similar to the one in FIG. 2, but additionally provided with a torque indicator between the nose-wheel holder and the stand.
Figure 10:
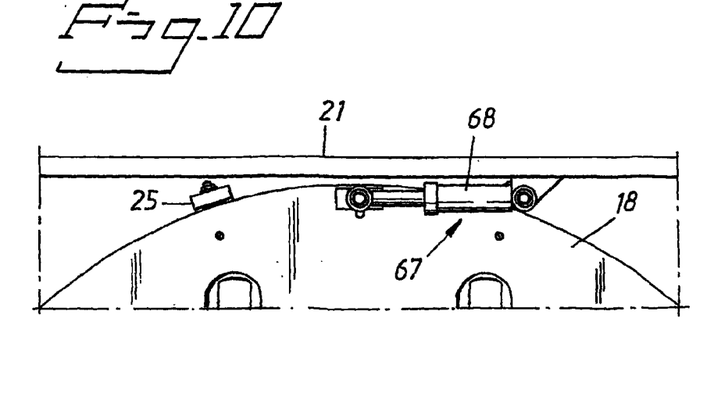
FIG. 10 shows the torque indicator in FIG. 9.

In the embodiment in accordance with FIG. 9, a torque indicator 67, the construction of which is further illustrated by FIG. 10, is used instead of a braking mechanism. A piston cylinder 68 flexibly connects the stand 17 and the nose-wheel holder 18 and reacts to changes in the torque in the nose-wheel holder 18. When 80 percent, for instance, of the maximum torque is attained, the indicator 67 emits a signal to the driver, who then has the opportunity of reducing the torque by changing the direction of the traction vehicle. If this is not done and close to 100 percent of the maximum torque is attained, a signal is emitted that engages an alarm and automatically suspends the aircraft-movement operation.

The engagement and hoisting device in accordance with the invention enables the angle between the traction vehicle and the aircraft to be measured without direct contact. The risk of human error, that is the danger of the driver or some other person assembling equipment of the type described in SE-501 788, for instance, incorrectly is eliminated.

The traction vehicle in accordance with the invention enables simple and quick docking and coupling with the nose wheel or nose wheels without the aircraft being disturbed from its parked position and without using a screw joint or the like. The nose wheel has to be lifted only a short distance, for instance about 50–100 mm, to clear any unevenness in the transport path. The height of the construction is sufficiently modest to allow it to clear the flaps hanging down on the sides of the nose-wheel stand. The engagement and hoisting device in accordance with the invention with its said rotation girdle, formed by said journalling members 70, 71, is unique, in that it allows rotation and generation of torque, respectively, during the application of tractive forces, as well as braking forces, and in that the engagement elements acting against the nose wheel do not impede such a function in any way.

What is claimed is:

1. A traction vehicle (2) for ground movement of an aircraft (1), having at least one nose wheel (4), which traction vehicle (2) comprises:

a wheel-mounted chassis (7) and
an engagement and hoisting device (12) that can be raised and lowered relative to the chassis (7) and is of a type that is brought into freely carrying engagement with the nose wheel (4) and which comprises
a stand (17), being substantially U-shaped with its opening turned towards the aircraft (1),
journalling members (15), flexibly connecting the stand (17) to the chassis (7),
actuators (13), arranged between the stand (17) and the chassis (7) to raise and lower the engagement and hoisting device (12) relative to the chassis (7), and
a nose-wheel holder (18), having
an inner space (35) that can be opened in the direction of the nose wheel (4) for receiving the same,
carrying members (43, 48) for carrying the nose wheel (4) in said space (35), and
forward and rear wheel supports (44, 49) for holding the nose wheel (4) in the longitudinal direction of the traction vehicle, characterized in:
that the nose-wheel holder (18) and the stand (17) are shaped as two separate units and comprise co-operating journalling members (70, 71), arranged in a circular arc and defining a vertical axis of rotation for said units (17, 18), and
that the nose-wheel holder (18) is substantially U-shaped with its opening turned towards the aircraft (1) as viewed in a starting position, when the nose-wheel holder (18) is situated to be moved into a position to receive the nose wheel (4).

2. A traction vehicle as claimed in claim 1, characterized in that the journalling members (70) of the stand (17) comprise a plurality of rolling elements that are mounted along a circular arc on a bottom plate (22) of the stand (17) by means of angle profiles (25), which rolling elements comprise first and second rollers (26; 28), rotatably journalled to the horizontal and vertical parts of each angle profile (25), respectively, to co-operate with the journalling members (71) of the nose-wheel holder in the form of vertical, opposing, concentric supporting and rolling surfaces (39, 40) and a horizontal carrying and rolling surface (38), which supporting and rolling surfaces (39, 40) together with said first rollers (26) define the vertical axis of rotation of the nose-wheel holder (18).

3. A traction vehicle as claimed in claim 2, characterized in that the nose-wheel holder (18) has outer edge portions (36) that are arc-shaped so that it acquires a vertical outside (37) with a pre-determined radius that is somewhat greater than the radius of an arc-shaped inside (24) of the bottom plate (22) of the stand (17).

4. A traction vehicle as claimed in claim 1, characterized in that the stand (17) and the nose-wheel holder (18) are provided with co-operating stops (55, 56, 57) that are arranged to limit the rotation of the nose-wheel holder (18) in both directions from a central starting position.

5. A traction vehicle as claimed in claim 4, characterized in that the stand (17) is provided with two terminal position transducers (58, 59) arranged in front of the two stops (55, 56) on the stand (17) for sensing the stop (57) of the nose-wheel holder (18) to indicate the angle of rotation of the nose-wheel holder (18) relative to the stand (17) and the traction vehicle (2).

6. A traction vehicle as claimed in claim 1, characterized in that the nose-wheel holder (18) is arranged to be able to rotate freely when the direction of travel of the traction vehicle (2) changes relative to the aircraft (1).

7. A traction vehicle as claimed in claim 1, characterized in that the engagement and hoisting device (12) comprises a rotation-inhibiting device acting between the stand (17) and the nose-wheel holder (18) for generating a moment of torque between the stand (17) and the nose-wheel holder (18) when the direction of travel of the traction vehicle (2) changes relative to the aircraft (1).

8. A traction vehicle as claimed in claim 7, characterized in that the rotation-inhibiting device consists of a break-device (60), arranged on the stand (17) and the nose-wheel holder (18) to secure the nose-wheel holder (18) against free rotation in a starting position, the break-device (60) being arranged to break when the nose-wheel holder (18) is subjected to a pre-determined, permitted torque relative to the stand (17).

9. A traction vehicle as claimed in claim 7, characterized in that the rotation-inhibiting device consists of a braking mechanism (62), arranged to act with a pre-determined braking power between the stand (17) and the nose-wheel holder (18), which braking power is arranged to be overcome when a pre-determined, permitted torque acts on the nose-wheel holder (18).

10. A traction vehicle as claimed in claim 7, characterized in that the rotation-inhibiting device consists of a torque indicator (67), attached to the stand (17) and the nose-wheel holder (18) and arranged to sense and react to changes in the torque in the nose-wheel holder (18).

11. A device for a traction vehicle (2) for ground movement of an aircraft (1), having at least one nose wheel (4), which traction vehicle has a wheel-mounted chassis (7), which device is designed to be brought into freely carrying engagement with and raise the nose wheel (4) relative to the chassis and which comprises:

- a stand (17), being substantially U-shaped with its opening turned towards the aircraft (1),
- journalling members (15), flexibly connecting the stand (17) to the chassis (7),
- actuators (13), arranged between the stand (17) and the chassis (7) to raise and lower the engagement and hoisting device (12) relative to the chassis (7), and
- a nose-wheel holder (18), having
    - an inner space (35) that can be opened in the direction of the nose wheel (4) for receiving the same,
    - carrying members (43, 48) for carrying the nose wheel (4) in said space (35), and
    - forward and rear wheel supports (44, 49) for holding the nose wheel (4) in the longitudinal direction of the traction vehicle, characterized in:

- that the nose-wheel holder (18) and the stand (17) are shaped as two separate units and comprise co-operating journalling members (70, 71), arranged in a circular arc and defining a vertical axis of rotation for said units (17, 18), and
- that the nose-wheel holder (18) is substantially U-shaped with its opening turned towards the aircraft (1) as viewed in a starting position, when the nose-wheel holder (18) is situated to be moved into a position to receive the nose wheel (4).

12. A device as claimed in claim 11, characterized in that the journalling members (70) of the stand (17) comprise a plurality of rolling elements that are mounted along a circular arc on a bottom plate (22) of the stand (17) by means of angle profiles (25), which rolling elements comprise first and second rollers (26; 28), rotatably journalled to the horizontal and vertical parts of each angle profile (25), respectively, to co-operate with the journalling members (71) of the nose-wheel holder in the form of vertical, opposing, concentric supporting and rolling surfaces (39, 40) and a horizontal carrying and rolling surface (38), which supporting and rolling surfaces (39, 40) together with said first rollers (26) define the vertical axis of rotation of the nose-wheel holder (18).

13. A device as claimed in claim 12, characterized in that the nose-wheel holder (18) has outer edge portions (36) that are arc-shaped so that it acquires a vertical outside (37) with a pre-determined radius that is somewhat greater than the radius of an arc-shaped inside (24) of the bottom plate (22) of the stand (17).

14. A device as claimed in claim 11, characterized in that the stand (17) and the nose-wheel holder (18) are provided with co-operating stops (55, 56, 57) that are arranged to limit the rotation of the nose-wheel holder (18) in both directions from a central starting position.

15. A device as claimed in claim 14, characterized in that the stand (17) is provided with two terminal position transducers (58, 59) arranged in front of the two stops (55, 56) on the stand (17) to sense the stop (57) of the nose-wheel holder (18) to indicate the angle of rotation of the nose-wheel holder (18) relative to the stand (17) and the traction vehicle (2).

16. A device as claimed in claim 12, characterized in that the nose-wheel holder (18) is arranged to be able to rotate freely when the direction of travel of the traction vehicle (2) changes relative to the aircraft (1).

17. A device as claimed in claim 12, characterized in that the engagement and hoisting device (12) comprises a rotation-inhibiting device acting between the stand (17) and the nose-wheel holder (18) for generating a moment of torque between the stand (17) and the nose-wheel holder (18) when the direction of travel of the traction vehicle (2) changes relative to the aircraft.

18. A device as claimed in claim 17, characterized in that the rotation-inhibiting device consists of a break-device (60), arranged on the stand (17) and the nose-wheel holder (18) to secure the nose-wheel holder (18) against free rotation in a starting position, the break-device (60) being arranged to break when the nose-wheel holder (18) is subjected to a pre-determined, permitted torque relative to the stand (17).

19. A device as claimed in claim 17, characterized in that the rotation-inhibiting device consists of a braking mechanism (62), arranged to act with a pre-determined braking power between the stand (17) and the nose-wheel holder (18), which braking power is arranged to be overcome when a pre-determined, permitted torque acts on the nose-wheel holder.

20. A device as claimed in claim 17, characterized in that the rotation-inhibiting device consists of a torque indicator (67), attached to the stand (17) and the nose-wheel holder (18) and arranged to sense and react to changes in the torque in the nose-wheel holder (18).

* * * * *

UNITED STATES PATENT AND TRADEMARK OFFICE
CERTIFICATE OF CORRECTION

PATENT NO. : 6,739,822 B2  Page 1 of 1
DATED : May 25, 2004
INVENTOR(S) : Johansson It is certified that error appears in the above-identified patent and that said Letters Patent is hereby corrected as shown below:

Title page,
Please insert Item:

-- [30]  Foreign Application Priority Data

June 26, 2000    [SE] Sweden    0002376-2 --.
Item [56], References Cited, FOREIGN PATENT DOCUMENTS, please delete "SE   591788   5/1995" and insert therefor -- SE   501788   5/1995 --.

Column 4,
Line 12, delete the comma "," after "enable".

Signed and Sealed this

Twenty-seventh Day of July, 2004

JON W. DUDAS
*Acting Director of the United States Patent and Trademark Office*

UNITED STATES PATENT AND TRADEMARK OFFICE
CERTIFICATE OF CORRECTION

PATENT NO.    : 6,739,822 B2
DATED         : May 25, 2004
INVENTOR(S)   : Johansson

It is certified that error appears in the above-identified patent and that said Letters Patent is hereby corrected as shown below:

Title page,
Item [57], ABSTRACT, please delete the current Abstract and insert the following Abstract therefor:

-- A traction vehicle for moving an aircraft by engaging a nose wheel comprises a wheel-mounted chassis including an engagement and hoisting device that can be raised and lowered. The engagement and hoisting device has a nose-wheel holder and a U-shaped stand having an opening facing the aircraft. The nose-wheel holder and the stand are shaped as two separate units and have co-operating journaling members arranged in a circular arc to provide rotational movement between the holder and the stand.

Signed and Sealed this

Twenty-eighth Day of September, 2004

JON W. DUDAS
*Director of the United States Patent and Trademark Office*